United States Patent [19]

Pabst

[11] Patent Number: 5,902,617
[45] Date of Patent: May 11, 1999

[54] ENZYME SUPPLEMENTED BABY FORMULA

[76] Inventor: Patrea L. Pabst, 616 E. Ponce de Leon Ave., Decatur, Ga. 30030

[21] Appl. No.: 07/885,490

[22] Filed: May 19, 1992

[51] Int. Cl.$^6$ .................................................... A23C 9/12
[52] U.S. Cl. .............................. 426/61; 426/34; 426/35; 426/62; 426/63; 426/801
[58] Field of Search ................................. 426/34, 35, 61, 426/62, 63, 801

[56] References Cited

U.S. PATENT DOCUMENTS

| | | | |
|---|---|---|---|
| 3,615,687 | 10/1971 | Mochizuki et al. | 99/102 |
| 4,079,125 | 3/1978 | Sipos | 424/32 |
| 4,303,692 | 12/1981 | Gaull | 426/580 |
| 4,617,190 | 10/1986 | Montgomery | 426/61 |
| 4,826,679 | 5/1989 | Roy | 424/94.21 |
| 4,830,861 | 5/1989 | Puski et al. | 426/801 |
| 4,925,680 | 5/1990 | Schweikhardt et al. | 426/61 |
| 4,944,944 | 7/1990 | Tang et al. | 424/94.6 |
| 5,000,975 | 3/1991 | Tomarelli | 426/602 |
| 5,039,532 | 8/1991 | Jost et al. | 426/41 |

FOREIGN PATENT DOCUMENTS

| | | |
|---|---|---|
| 0325986 | 8/1989 | European Pat. Off. . |
| 0016616 | 5/1980 | Japan . |

OTHER PUBLICATIONS

*Textbook of Gastroenterology and Nutrition in Infancy* Second Edition, edited by F. Lebenthal (Rayen press, NY 1989), Chapter 12, pp. 97, 106–109 1989); Chapter 13, pp. 121–129; Chapter 17, pp. 158–159; Chapter 24, pp. 302–303; Chapter 26, pp. 332–332; Chapter 35, pp. 436–437.

Alemi, et al., "Fat Digestion in Very Low–Birth–Weight Infants: Effect of Addition of Human Milk to Low–Birth–Weight Formula", *Pediatrics* vol. 68, No. 4, pp. 484–489 (Oct. 4, 1981).

Hernell, O., "Human Milk Lipases, Physiological Implications on the Bile Salt–Stimulated Lipase", *J. Clin. Invest.* 5, 267–272 (1975).

Ross Laboratories, Colombus, Ohio, Division of Abbott Laboratories, Nutrient Chart—Composition of Feedings for Infants at Home, (1988–1989).

Textbook excerpt provided by Dr. Edith Pilzer, Pediatric Gastroenterologist for applicant's child, No date.

*Primary Examiner*—Lien Tran
*Attorney, Agent, or Firm*—Patrea L. Pabst, Esq.

[57] ABSTRACT

A baby formula is provided having enzymes added to imitate the effect of those present in normal breast milk, aiding digestion of protein, carbohydrate (simple and complex sugars), and lipid. The enzymes are either of procaryotic or eucaryotic origin, isolated from fermentation broth or tissue, or expressed from recombinant gene sequences. The enzymes are provided in a form for addition to the formula prior to feeding the infant or at the time of feeding. In the preferred form, the enzymes are provided in a form that is stable to storage in the formula, but active when the formula reaches the portion of the gastrointestinal tract where the formula would normally be digested. In the most preferred embodiment, the enzymes are provided in a matrix with an enteric coating that releases the enzyme in the upper portion of the intestine. Depending on the formulation, proteases, carbohydrate degrading enzymes such as alpha-amylase, lactase, fructase, and sucrase, or lipases, are added to the formulation.

26 Claims, No Drawings

ENZYME SUPPLEMENTED BABY FORMULA

The present invention is in the general field of baby formulas and specifically is an enzyme supplemented baby formula.

The American Academy of Pediatrics recommends that babies be breast fed if possible. Unfortunately, for reasons ranging from illness and exhaustion to the need to immediately return to work after having the baby, many mothers have no option other than to formula feed. Moreover, particularly in the case of premature or sick babies, the babies are unable to suckle and must be fed from the bottle.

There are three general classes of formulas commercially available for babies in the United States: those based on milk, those based on soy proteins, and those based on hydrolysates of casein, a milk protein. These have been carefully formulated to provide the infant with the calories, protein, carbohydrate and vitamins that are needed for good growth and resistance to disease. In addition, the soy based formulas have been developed to provide adequate nutrition for the infants that cannot tolerate lactose or are allergic to milk proteins. The casein hydrolysates have been further developed for children who do not digest protein well or who suffer from malabsorption or poor eating habits.

However, it has consistently been observed that many babies do not tolerate formula well, and it is common for tired, frustrated parents to go from one formula to the next until they finally find a formula that their child is not "allergic" to. Most pediatricians respond by advising the parents that the child will grow out of this phase and suggest use of the liquid simethacone suspensions, such as Phazyme™ to relieve gas and an anticholinergic such as Levsin™ to relieve the intestinal cramping that are characteristic of this condition, commonly referred to as "colic".

It would clearly be preferable to provide a formula closer in digestibility to breast milk.

It is therefore an object of the present invention to provide a baby formula with improved digestibility.

It is a further object of the present invention to provide a baby formula providing increased caloric value and decreased residue.

It is a still further object of the present invention to provide a baby formula not causing colic, gas, and gastrointestinal spasms due to fermentation of undigested material by the normal flora of the gastrointestinal tract.

SUMMARY OF THE INVENTION

A baby formula is provided having enzymes added to imitate the effect of those present in normal breast milk, aiding digestion of protein, carbohydrate (both simple and complex sugars), and lipid. The enzymes are either of procaryotic or eucaryotic origin, isolated from fermentation broth or tissue, or expressed from recombinant gene sequences. The enzymes are provided in a form for addition to the formula prior to feeding the infant or at the time of feeding. In the preferred form, the enzymes are provided in a form that is stable to storage in the formula, but active when the formula reaches the portion of the gastrointestinal tract where the formula would normally be digested. In the most preferred embodiment, the enzymes are provided in a matrix with an enteric coating that releases the enzyme in the upper portion of the intestine. Depending on the formulation, proteases, carbohydrate degrading enzymes such as lactase, fructase, and sucrase, and/or lipases, are added to the formulation. The selection of the amount of enzyme, as well as the specificity, is determined by the composition of the formulation. For example, where the formulation contains lactose, a lactase would be added to provide sufficient units of activity at the portion of the intestine where the lactose is digested to digest approximately 50 to 70% of the lactose, based on an assumption that the infant does not produce any lactase of his own, and would therefore be present in a surplus amount.

DETAILED DESCRIPTION OF THE INVENTION

Although extensive efforts have been made to duplicate the caloric value, protein and mineral levels and taste of breast milk, it still generally requires two to three times as much formula as breast milk to sustain a baby. Weight gain, as well as resistance to infection, is consistently greater in breast fed babies than in formula fed babies. Breast fed babies are able to utilize almost one hundred percent of the breast milk, in large part due to the action of the enzymes provided by the mother in the breast milk. In contrast, the one-half to two-thirds of undigested formula passes through into the diaper of formula fed babies.

Undigested material, particularly the simple sugars, is frequently trapped in the intestine where it is fermented by the normal gut flora, causing gas and discomfort due to spasm and distention. An analogous condition occurs in lactase deficient (or "lactose intolerant") adults who eat dairy products. It is this undigested formula, not an "allergy", that causes babies to be intolerant to some formulas and to tolerate others. The condition is generally outgrown by the time the infant reaches the age of six months, although there is a wide variation among individuals. In general, babies begin to produce carbohydrate-degrading enzymes from birth to two months of age, proteases (trypsin) from four to six months of age, and lipases from eight to nine months of age.

The enzymes, hormones, and other biologically active components of milk are described in detail in *Textbook of Gastroenterology and Nutrition in Infancy,* Chapter 12 "Hormones in Milk: Their Possible Physiological Significance for the Neonate" by Koldovsky, pp. 97–120, and Chapter 13 "Enzymes in Human Milk: Their Role in Nutrient Digestion, Gastrointestinal Function, and Nutrient Delivery to the Newborn Infant", by Hamosh, pp. 121–129, second edition, edited by E. Lebenthal (Raven Press, N.Y. 1989). In addition to enzymes, breast milk contains hypothalamo-Hypophyseal hormones such as prolactin, somatostatin, melatonin, oxytocin, growth hormone-releasing factor and growth hormone, thyroid gland hormones such as calcitonin, adrenal gland hormones, sexual gland hormones such as estrogen and progesterone, pancreatic hormones such as insulin, growth factors, erythropoietin, neurotensin, and other peptides.

Baby formula is provided based on either milk or soy proteins, carbohydrate and lipid, having one or more types of added enzymes present in the formula to increase digestibility in the infant. In the preferred embodiment, proteases, carbohydrate-degrading enzymes, and lipases are added. In the most preferred embodiment, the enzymes are stabilized or provided within an enteric coating that preserves maximal enzymatic activity until the enzyme is released in the small intestine.

Baby Formula Compositions

Examples of commercial baby formulas are provided in Table I. These are available at grocery stores and from pediatricians. Other formulas based on a variety of protein and carbohydrate sources are also available. Formulas can be in the form of a liquid in a ready to feed concentration or a concentrate, or dehydrated or lyophilized. The caloric values of the commercially shown formulas are shown based on a volume basis in a liquid form ready for feeding to the infant. The caloric value of breast milk is also shown. Addition of the enzymes described herein increases the caloric value on a weight basis (i.e., percent of grams protein, carbohydrate, and/or lipid) to a value between those shown for the commercially available formulations and that of breast milk, depending on the enzyme source, form and total units added.

Carbohydrate Degrading Enzymes

Lactase, Sucrase, and Fructase

Lactase, sucrase and fructase are commercially available either in liquid form or in tablets for ingestion immediately prior to, or at the time of, ingestion of dairy, sucrose, and fruit or other fructose containing products, respectively. Two commercial sources of lactase are the Lactaid Company and the Dairy Ease Co.

Other Enzymes

Alpha amylase is present in human breast milk and plays a particular role in digestion of polysaccharide. Although the

TABLE I

Composition of Commercially Available Formulations compared with Human Breast Milk

|  | Human Milk | Similac ™ | Enfamil ™ | Isomil ™ | Alimentum ™ | Cow Milk |
|---|---|---|---|---|---|---|
| Energy, Cal | 680 | 676 | 670 | 676 | 676 | 629 |
| Protein, g | 10.5 | 15.0 | 15 | 18.0 | 19.0 | 33.9 |
| % of Total Calories | 6 | 9 | 9 | 11 | 11 | 21 |
| Source | human milk | cow's milk | reduced mineral whey & milk | soy protein isolate | casein hydrolysate Cys, Tyr, & Trp | cow's milk |
| Fat, g | 39 | 36.3 | 38 | 36.9 | 37.5 | 34.4 |
| % of Total Calories | 52 | 48 | 50 | 49 | 48 | 49 |
| Source | human milk | soy & coconut oils | coconut & soy oils | soy & coconut oils | medium chain triglycerides | butter fat |
| Fatty Acids |  |  |  |  |  |  |
| Polyunsaturated, g | 4.8 | 13 | 11 | 14 | 12.7 | 1.3 |
| Saturated, g | 17.4 | 16 | 18 | 16 | 18.2 | 21.4 |
| Monounsaturated, g | 14.9 | 6 | 6 | 6 | 2.8 | 10.1 |
| Linoleic acid, mg | 3971 | 8790 | 7400 | 8790 | 10816 | 825 |
| Carbohydrate, g | 72 | 72.3 | 69.0 | 68.3 | 68.9 | 48.5 |
| % of Total Calories | 42 | 43 | 41 | 40 |  |  |
| Source | lactose | lactose | lactose | corn syrup sucrose & sucrose starch |  | lactose |
| Minerals |  |  |  |  |  |  |
| Vitamins |  |  |  |  |  |  |
| Other Nutrients |  |  |  |  |  |  |
| Water, g | 880 | 900 | 900 | 900 | 900 | 907 |

Excerpted from Table prepared by Ross Laboratories.
See also Pediatric Nutrition Handbook, ed 2, Elk grove Village, Ill., American Academy of Pediatrics, 1985, pp. 363–368.

Enzymes

Proteases

Breast milk contains both proteolytic enzymes and protease-inhibitors. Proteases include trypsin (present in breast milk in a concentration of between 2.9 and 5.6 micrograms per liter), elastase, and a protease with caseinolytic activity. Although casein is a minor component (20% of total protein) in human milk, it is a major component of bovine milk and is therefore particularly desirable where the formula is of bovine milk origin. Caseinolytic activity can be provided by addition of plasmin or plasminogen activator to the milk.

An example of a commercially available broad spectrum protease that is approved for use in food is papain. Papain, however, is not stable to the low pHs of the stomach and is inactivated by cooking. It is therefore preferably provided encapsulated within an enteric coating. Trypsin and many other proteases are commercially available for other uses and can be packaged for release in the intestine. These enzymes would preferably be lyophilized and packaged with lyophilized or dried formula, where they would not prematurely digest the formula, or be encapsulated in a material not releasing the enzyme until after passage through the intestine.

normal infant is born producing adequate levels of lactase and sucrase (except for those of certain ethnic background, especially African, Asian, and middle eastern), alpha amylase, the chief polysaccharide digesting enzyme, is not developed at birth. Breast milk contains between 1.2 and 1.5 g/dl oligosaccharides. To digest these and the other glucose polymers or starch of infant formulas, as well as that of the first cereal supplements such as rice cereal, alpha-amylase is essential. Levels of between 2000 and 10,000 units of alpha-amylase are present per liter of breast milk, decreasing with weeks of lactation.

Alpha amylase is stable during passage through the stomach and can be included in the formulation without further modification. It is stable at pH 3.0 for 2 hour, and has a pH optimum from 4.5 to 7.5. The preferred type is salivary alpha-amylase, although pancreatic alpha-amylase is also useful. Bovine milk does not contain alpha-amylase.

Other carbohydrate degrading enzymes are commercially available as bacterial lysates that contain one or more enzymes. One such preparation is currently being marketed for use on animal food to decrease gas production arising from incomplete digestion of soy fillers. The same extract from *Aspergillus niger* is distributed by the Lactaid Co. as "Beano"™.

Lipases

Typically, most baby formulas contain lipids or fats only as emulsification agents, not to increase caloric value. However, the fat in breast milk is a major source of calories.

Two types of lipases are present in breast milk: regular lipases and bile salt activated lipases. The addition of bile salt activated lipases, including the bile salt activated lipase of breast milk and pancreatic carboxylase, to baby formula is taught by U.S. Pat. No. 4,944,944 to Tang, the teachings of which are incorporated herein. This enzyme is stable to pH less than 3.0 and has a pH optimum of between 7.4 and 8.5. This enzyme is not stable to pasteurization. The lipase is particularly important for digestion of long chain fatty acids, $C_{12}$ to $C_{22.6}$, which makes up a very high percentage of most milks (99% of human breast milk).

Sources of enzymes

There are essentially two sources of enzymes: naturally occurring enzymes that are produced by bacteria or present in tissues which are isolated from these sources or enzymes produced by genetic engineering. It is not necessary in all cases that the enzymes be provided in purified form. Extracts or enzyme concentrates may also be used as long as they are free of contaminating materials that could cause a toxic or immunogenic effect in the baby. Suitable proteases, carbohydrate degrading enzymes, and lipases are all commercially available.

Quantity of Enzyme added to formula

Enzymes by definition are not consumed by reaction with their substrate. Accordingly, while there is no minimum or maximum amount of enzyme that can be added to the formulation, the amount will generally be determined based on the rate at which the enzyme acts under the conditions where the substrate is to be digested, for example, at pH 5.5 and 37° C. in the upper portion of the lower intestine, times the quantity of substrate to be digested, divided by the amount of time the food passes through the intestine. Ideally, that amount of enzyme would be added which results in complete digestion of the substrate by the time the material reaches the end of the colon. In some cases this will actually be an excess amount since the infant will be producing some enzyme of his own. Due to concerns about enzyme stability and interference from other materials in the formulation, an excess of enzyme will usually be provided.

Other Additives

Protease Inhibitors

Breast milk contains protease inhibitors, presumably to help preserve the milk until it reaches the intestine where it is digested. The inclusion of protease inhibitors can therefore be used for the same principle in the improved baby formula—to inhibit digestion of the enzymes by the added enzymes, especially proteases, until the formula is ingested. In the preferred embodiment, these inhibitors will be acid labile so that they are active in the formula but inactivated or degraded when proteolytic activity is needed following passage of the formula through the stomach.

Examples of protease inhibitors in breast milk include alpha-1-antitrypsin and alpha-1-antichymotrypsin.

Other inhibitors such as sulfhydryl oxidase are present in human milk and act to inhibit degradation of proteins.

Antibodies

Although generally not added due to the additional expense and concerns about contamination with viruses, antibodies can be added to the formula, as in breast milk, to increase resistance of the infant to infection. Infants are highly unusual in being able to absorb antibodies directly into the blood stream through the intestine for the first several months. Accordingly, antibodies can be administered to the infant orally rather than by injection.

Antibodies would typically be obtained by methods routinely used to extract polyclonal antibodies from sera, such as ammonium sulfate precipitation or by absorption to an ion exchange resin or affinity chromatographic substrate such as a Protein A affinity resin.

Packaging of Additives

In the simplest embodiment, formula is lyophilized or in dried form so that the additives are not actively degrading the formula components to a significant amount. Selection of additives that are acid stable are required for this embodiment, or the inclusion of stabilizers is required. However, it is preferred that the additives be packaged so that they are released when the formula reaches the small intestine.

Enteric coatings

A number of enteric coatings are used for drug delivery and are listed in references available to those skilled in the art, such as the Pharmacopeaia.

Microcapsule formulations

A number of microcapsule formulations are available for release in the intestine. For example, some of the biodegradable polymers such as polylactide and polyglycolide, as described in U.S. Pat. No. 4,767,628 to Hutchinson and U.S. Pat. No. 4,897,268 to Tice, et al., or protein, as described in U.S. Pat. No. 4,925,673 to Steiner and PCT/US90/06430 by Enzytech, Inc. for "Method for Producing Protein Microspheres", are designed for encapsulation of biologically labile materials that are intended for release in the gastrointestinal tract. Most suitable polymers are hydrolytically unstable and can be designed to degrade within a few hours of exposure to water. These would be used in dried or lyophilized preparations, so that release would be initiated at the time of rehydration and substantially completed at the time the formula reached the small intestine. The Steiner, et al., microcapsules are designed to release as a function of pH, being stable to acid pH and releasing at an elevated pH, such as the pH 6.5 to 7.0 of the upper portion of the small intestine.

Stabilizers

The enzymes can be stabilized with materials available to those skilled in the art, such as albumin, casein, sucrose and lactose. The advantage of the latter is that these are components of many of the commercially available baby formulations.

Buffers and Salts

In some embodiments, it may be useful to encapsulate with the additives buffers that maintain the pH, or ionic strength of the formula so that the enzymes are stabilized until no longer needed.

Administration of Additives to the formula at the time of feeding

Although described above with reference to inclusion in the formula, it is clearly possible to add the enzymes as a concentrate, similar to the way in which lactase is now available for treatment of milk. In this embodiment, the additives, including protease, lipase, and carbohydrate degrading enzymes, or protease and carbohydrate degrading enzymes, are packaged together in a buffered solution, filtered with a 0.2 micron filter to sterilize the formulation, and refrigerated once opened. The formulation is designed to be added as drops per volume (typically six to eight ounces). The additives can be administered at the time of feeding, or more preferably, in advance, to allow pre-digestion of the substrates by the additives.

Modifications and variations of the present invention, a baby formulation having increased digestibility, and methods of administration and preparation thereof, will be obvious to those skilled in the art from the foregoing detailed description and are intended to come within the scope of the appended claims.

I claim:

1. An improved non-human milk baby formula including protein, carbohydrate and lipid which is suitable for administration to an infant comprising an enzyme selected from the group consisting of protease enzymes and polysaccharide degrading enzymes, wherein the enzyme is in a form that will be enzymatically active in the digestive system of an infant to whom the baby formula is administered and is present in an amount effective to completely digest an enzyme substrate in the formula by the time the substrate reaches the end of the colon.

2. The formula of claim 1 further comprising lipase.

3. The formula of claim 1 further comprising a sugar degrading enzyme.

4. The formula of claim 1 wherein the enzyme is selected from the group consisting of alpha amylase, trypsin and papain.

5. The formula of claim 2 wherein the lipase is a bile salt activated lipase or pancreatic carboxylase.

6. The formula of claim 3 wherein the sugar degrading enzyme is selected from the group consisting of sucrase, fructase, lactase, and *Aspergillus niger* enzyme extract.

7. The formula of claim 1 comprising protease, polysaccharide degrading enzyme, lipase, and sugar degrading enzyme.

8. The formula of claim 1 wherein the enzymes are encapsulated within a material releasing the enzymes in the small intestine.

9. The formula of claim 8 wherein the encapsulating material is selected from the group consisting of enteric coatings, synthetic polymers that are hydrolytically unstable, and proteins stable to low pH and unstable to the pH of the small intestine.

10. The formula of claim 1 further comprising an inhibitor selected from the group consisting of protease inhibitors and oxidation inhibitors.

11. The formula of claim 1 further comprising antibodies which are present in human breast milk.

12. A method for improving the digestibility of a non-human milk baby formula which is suitable for administration to an infant comprising providing in the formula an enzyme selected from the group consisting of proteases and polysaccharide degrading enzymes, wherein the enzyme is in a form that will be enzymatically active in the digestive system of an infant to whom the baby formula is administered and is present in an amount effective to completely digest the enzyme substrate in the formula by the time the substrate reaches the end of the colon.

13. The method of claim 12 further comprising adding lipase to the formula.

14. The method of claim 12 further comprising adding sugar degrading enzyme to the formula.

15. The method of claim 12 wherein the enzyme is selected from the group consisting of alpha amylase, trypsin and papain.

16. The method of claim 13 wherein the lipase is a bile salt activated lipase or pancreatic carboxylase.

17. The method of claim 14 wherein the sugar degrading enzyme is selected from the group consisting of sucrase, fructase, lactase, and enzymes from *Aspergillus niger*.

18. The method of claim 12 further comprising encapsulating the enzyme within a material releasing the enzyme in the small intestine.

19. The method of claim 18 wherein the encapsulating material is selected from the group consisting of enteric coatings, synthetic polymers that are hydrolytically unstable, and proteins stable to low pH and unstable to the pH of the small intestine.

20. The method of claim 12 further comprising adding an inhibitor selected from the group consisting of protease inhibitors and oxidation inhibitors.

21. The method of claim 12 further comprising adding antibodies which are present in breast milk to the formula.

22. The method of claim 12 wherein the formula is dried further comprising adding the protease to the formula upon rehydration.

23. The method of claim 12 wherein the protease is added to the formula at the time of formulation.

24. An additive to increase digestibility of non-human milk baby formula comprising a purified protease in combination with a purified polysaccharide degrading enzyme in a formulation for addition to non-human milk baby formula in an amount effective to completely digest an enzyme substrate in the formula by the time the substrate reaches the end of a colon.

25. The additive of claim 24 further comprising a lipase.

26. The additive of claim 24 further comprising a simple carbohydrate degrading enzyme selected from the group consisting of lactase, sucrase, fructase, and extract of *Aspergillus niger*.

* * * * *